United States Patent [19]
Hatada et al.

[11] 4,384,772
[45] May 24, 1983

[54] CAMERA

[75] Inventors: Kotaro Hatada, Toyonaka; Hiroshi Iwata, Nara; Tsunemi Yoshino, Ibaraki, all of Japan

[73] Assignee: West Electric Co., Ltd., Osaka, Japan

[21] Appl. No.: 261,640

[22] Filed: May 7, 1981

[30] Foreign Application Priority Data

May 14, 1980 [JP] Japan .................................. 55/64507

[51] Int. Cl.³ .............................................. G03B 3/10
[52] U.S. Cl. .................................................... 354/25
[58] Field of Search ........................ 354/25, 195, 198; 352/140

[56] References Cited

U.S. PATENT DOCUMENTS 4,239,357 12/1980 Iida ................................ 354/198 X

FOREIGN PATENT DOCUMENTS

48/60645 8/1973 Japan .
55/33118 3/1980 Japan ................................ 354/25 N Primary Examiner—Michael L. Gellner
Attorney, Agent, or Firm—Burgess, Ryan and Wayne

[57] ABSTRACT

A manual focusing camera provided with a focus detection means adapted to generate an output signal when the image of an object is sharply focused and a locking or arresting means responsive to the output signal from the focus detection means for pressing against the rear end face of the focusing ring of a photographic lens attached on the camera, thereby locking or arresting the further rotation of the focusing ring. Therefore, one can sense when the image is sharply focused. The focus detection means and locking or arresting means are very simple in construction and can be easily incorporated into the conventional cameras. Thus, positive and sharp focusing can be ensured.

4 Claims, 2 Drawing Figures

CAMERA

BACKGROUND OF THE INVENTION

There have been devised and demonstrated various types of rangefinders for cameras such as a superposed field system, a split-field system and a system particularly adapted for single-lens reflex cameras in which part of the light rays emerging from a single lens system are directed to pass through a lens array or a pin hole so that the image of an object is split so as to detect whether the object is sharply focused or not. Ultrasonic "radar" has also been proposed and used in practice. In either of these rangefinder systems, the distance to an object is converted into an electrical signal.

These rangefinders are incorporated not only in fixed-lens cameras; that is, cameras whose lens cannot be replaced, but also for cameras such as single-lens reflex cameras capable of selectively using one of various types of photographic lenses.

In the case of the fixed-lens camera, there has been devised and demonstrated an automatic focusing system in which a photographic lens is automatically shifted with a predetermined speed in a predetermined direction and then stopped automatically in response to the occurrence of an electrical output signal from the rangefinder.

However, in the case of the interchangeable-lens camera, even when the distance-to-object remains unchanged, the distance between the interchangeable lens and the film plane is different depending upon the type of the interchangeable lens used. Therefore, when the automatic focusing system for the fixed-lens camera of the type described above is used, the lens shifting velocity must be varied depending upon the type of an interchangeable lens used. As a result, the automatic focusing system for the interchangeable-lens camera becomes extremely complex in construction. In order to overcome this problem, there has been devised and demonstrated a system in which the focusing is made manually by rotating the focusing ring and when the object is sharply focused, an electrical signal is generated to turn on a light-emitting element to show a camera operator that the object is sharply focused. In another system as disclosed in Japanese Patent Application Laid-Open No. 116030/1975, when an object is sharply focused with a rangefinder, an electrical signal is generated which represents the distance-to-object. In response to this signal, a lens stopper is displaced to a predetermined position at which the lens is stopped when the lens is shifted.

In the former system, a suitable display means or the like is turned on so that a camera operator can stop the lens at a position at which the object is sharply focused on the film plane. But due to the characteristics of the display means or the like, confirmation errors occur, so that the lens is stopped at a wrong position at which the object is not sharply focused. Setting the lens at a wrong position is also caused by an unexpected shift of the lens.

In the latter system, the measurement of the distance-to-object is carried out independently. That is, there does exist a time interval from the time when the signal representative of the distance-to-object is generated to the time when the lens stopper is displaced and stopped at a predetermined position in response to the distance-to-object signal. Therefore, for instance, when the object moves from the initial position at which the distance-to-object signal is generated to another position before the lens stopper is set to a predetermined position, the lens is set at a wrong or out-of-focus position. As a result, there arises the problem of failure in accurately tracking the object.

SUMMARY OF THE INVENTION

The present invention was made to overcome the above and other drawbacks encountered in the prior art focusing systems for the interchangeable-lens cameras.

One of the objects of the present invention is to provide a semi-automatic focusing single-lens reflex camera with which one can sense the time when the object is sharply focused on the film plane.

Another object of the present invention is to provide a semi-automatic focusing single-lens reflex camera which incorporates a very simple system in addition to the components of a comparable conventional single-lens reflex camera so that the very accurate focusing can be accomplished.

A further object of the present invention is to provide a single-lens reflex camera capable of accurately tracking a moving object without any delay and accurately focusing it.

Briefly stated, a camera in accordance with the present invention is provided with a focus detection means for generating an output signal when an object is sharply focused and a locking or arresting means responsive to the output signal from the focus detection means for pressing against the rear end face of the focusing ring of an interchangeable lens used, thereby locking or arresting the rotation of the focusing ring.

According to one embodiment of the present invention, a switch is provided so that the camera can be switched between the semi-automatic focusing mode and the manual focusing mode. That is, when the switch is turned on so that the output from the focus detection means is transmitted to the locking or arresting means, the object is semi-automatically focused, but when the switch is turned off to disconnect between the focus detection means and the locking or arresting means, the latter remains deactivated so that the focusing is manually made.

The above and other objects, effects and features of the present invention will become more apparent from the following description of preferred embodiments of the present invention in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
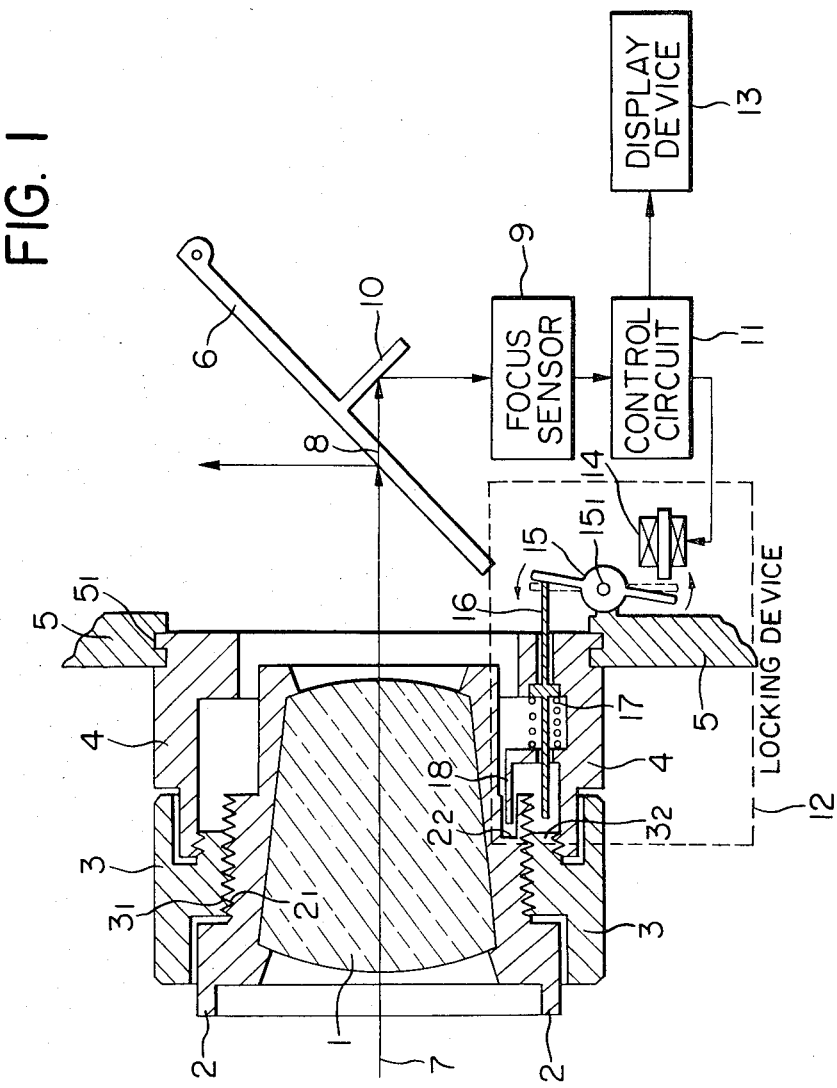
FIGS. 1 and 2 are schematic views of first and second embodiments, respectively, of the present invention.

Referring to FIG. 1, a photographic lens group 1 is securely mounted to an inner barrel or a lens barrel 2 with a precision multiple thread male screw $2_1$ called the "helicoid" and cut in the peripheral surface thereof. A focusing ring 3 has a female screw $3_1$ which is cut in the inner cylindrical wall thereof and is made into engagement with the male screw $2_1$ of the lens barrel. The focusing ring 3 has also a guide flange $3_2$ which is axially inwardly extended by a predetermined length. A stationary barrel 4 is securely mounted on a camera body 5 through a mount $5_1$ and is adapted to receive therein the lens barrel 2 and the focusing ring 3. The photographic lens group 1, the inner or lens barrel 2, the focusing ring 3 and the stationary barrel 4 constitute an interchangeable lens. When the focusing ring 3 is rotated, the lens barrel 2 and hence the lens group 1 are caused to be displaced toward or away from the camera body 5. In this case, the straight translation or motion of the lens barrel 2 is controlled by the engagement of a guide pin 18 extended axially outwardly from the stationary barrel 4 with a guide hole $2_2$ extended through the lens barrel 2 axially thereof. A retracting and reflecting mirror 6 is disposed within the camera body 5 so as to redirect the light rays 7 coming out of the photographic lens group 1 to a viewfinder system (not shown). The center portion 8 of the retracting and reflecting mirror 6 is semitransparent so as to pass part of the light rays 7 to an auxiliary reflecting mirror 10 which in turn redirects the light rays to a focus sensor 9, the auxiliary reflecting mirror 10 being made integral with and extended at right angles from the retracting and reflecting mirror 6. The focus sensor 9 is preferably of the type disclosed in Japanese published patent application No. 48-60645, an arrangement commonly known as "Corre-photo", developed by Leitz A.G.

The focus sensor 9 converts the light rays into an electrical signal which in turn is applied to a control circuit 11 which in turn delivers an output signal representative of a degree of focusing. The focus sensor 9 and the control circuit 11 constitute a focus detection unit which detects whether the object is focused or not by the state of the incident light to the focus sensor 9. In response to the output from the control circuit 11, a control circuit for locking the focusing ring 3 (to be referred to as "the locking device" in this specification) is actuated so as to lock the rotation of the focusing ring 3, whereby the displacement of the lens barrel 2 and hence the photographic lens group 1 are interrupted. The output signal from the control circuit 11 is also applied to a display device 13 which consists of light-emitting diodes or liquid-crystal elements and which displays whether the object is focused or not.

The locking device 12 comprises an electromagnet 14, an armature lever 15 which is pivoted with a pivot pin $15_1$ to the camera body 5 at the midpoint between the ends of the lever 15, a locking pin 16 which is slidable in the axial direction and a bias spring 17 which so urges the locking pin 16 as to be maintained at the position shown in FIG. 1.

Next, the mode of operation of the camera with the above-described arrangement will be described. One can focus an object by rotating the focusing ring 3 which in turn causes the lens barrel 2 and hence the photographic lens group 1 to be displaced toward or away from the camera body as in the case of the conventional camera. The light rays from the object pass through the photographic lens group 1 and the semitransparent center portion 8 of the retracting mirror 6 and are redirected by the auxiliary reflecting mirror 10 so as to be focused in the vicinity of the focus sensor 9. Thus, the focused image is converted by the focus sensor 9 into an electrical signal which in turn is applied to the control circuit 11. In response to the output signal from the focus sensor 9, the control circuit 11 detects whether or not the object is sharply focused.

In the first embodiment, the light rays transmitted through the photographic lens group are used for detecting whether or not the image is sharply focused as described previously, so that a simple rangefinder can be used.

When the control circuit 11 detects that the object is out-of-focus, the locking device 12 remains deactivated while the display device 13 displays the "out-of-focus" signal.

On the other hand, when the control circuit 11 detects that the object is sharply focused, in response to the output signal from the control circuit 11, the electromagnet 14 is energized so that one end (the lower end in FIG. 1) of the armature lever 15 is attracted by the magnet 14. As a result, the armature lever 15 is caused to rotate in the counterclockwise direction as indicated by the arrows about the pivot pin $15_1$ so that the other end (the upper end in FIG. 1) of the armature lever 15 pushes the locking pin 16 axially outwardly against the bias spring 17. As a result, the outer end of the locking pin 16 is pressed against the focusing ring 3, thereby locking its rotation. Thus, one can feel that his or her focusing operation is interrupted and consequently know or confirm that the object is now sharply focused.

As described previously, unless the object is sharply focused, the magnet 14 remains de-energized and consequently does not attract one end of the armature lever 15. As a result, the locking pin 16 remains in its initial position and is kept away from the focusing ring 3 so that one may freely rotate the focusing ring.

Figure 2:
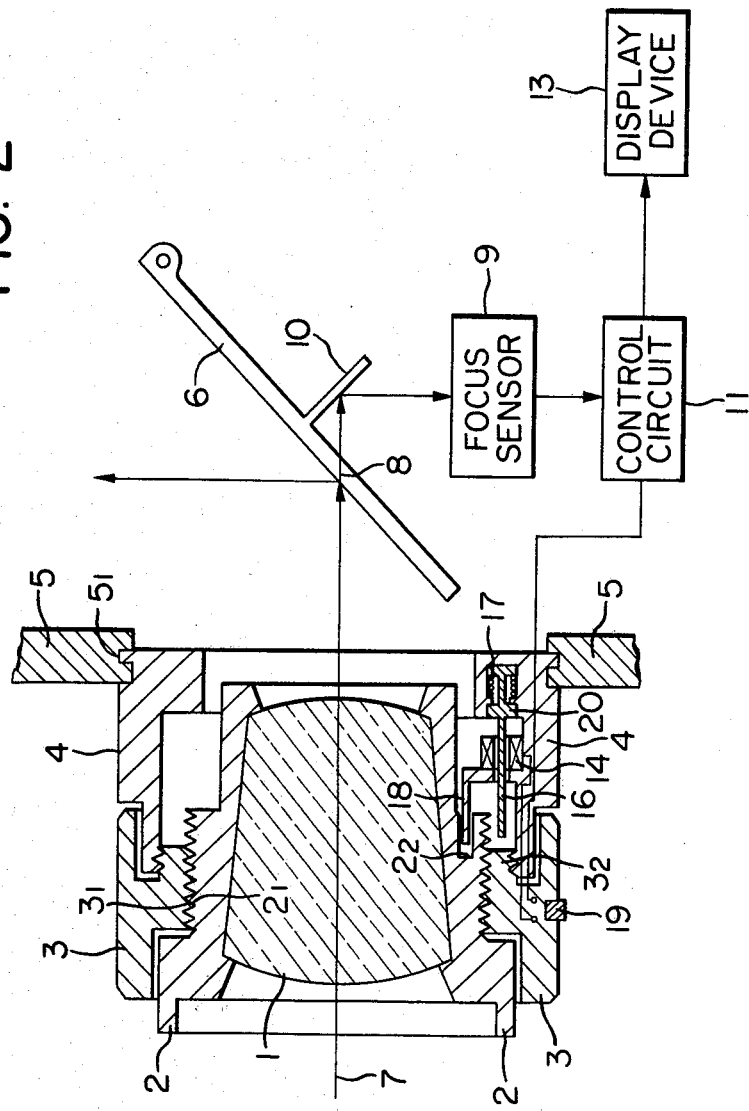

In FIG. 2 is shown a second embodiment of the present invention which is substantially similar to the first embodiment described above with reference to FIG. 1 except for the construction of the locking or arresting device and the addition of a switch 19 and a permanent magnet 20 mounted on or formed integral with the locking or arresting pin 16. The switch 19 is manually operable so as to connect the electromagnet 14 to the control circuit 11 or to disconnect the former from the latter as will be described in more detail below. Briefly stated, the second embodiment is different from the first embodiment in that the locking or arresting device is incorporated not in the camera body but in the camera or interchangeable lens and that the output signal from the control circuit 11 can be selectively transmitted to the locking or arresting device.

Next, the mode of operation of the second embodiment with the above-described construction will be described. The fundamental operation of the second embodiment is similar to that of the first embodiment. That is, in response to the input signal from the focus sensor 9, the control circuit 11 detects whether or not the object is focused and delivers the output signal to the locking or arresting device 12 and to the display device 13.

In the second embodiment, in order to incorporate the locking or arresting device 12 in the camera or interchangeable lens, instead of the armature lever 15 which is comparatively large in size and is used in the first embodiment, the permanent magnet 20 is used. Therefore, when the control circuit 11 detects that the object is sharply focused and subsequently delivers the output signal to the locking or arresting device 12, the electromagnet is energized. As a result, the permanent magnet 20 is attracted by the electromagnet 14 and subsequently the locking or arresting pin 16 is forced to be diplaced to the left and pressed against the focusing ring 3, thereby locking or arresting the rotation thereof. In the second embodiment the attractive force interacting between the electromagnet 14 and the permanent magnet 20 is the force with which the locking pin 16 is pressed against the focusing ring 3.

In addition, according to the second embodiment, the control circuit 11 may be disconnected from the electromagnet 14 by turning off the switch 19 as described previously so that the focus detection system may be activated. This arrangement is very advantageous, for instance, when one wants to focus an object out of the automatic focusing range of the system.

So far the focus detection system has been described as an optical type, but it is to be understood that an ultrasonic "radar" may be equally used. That is, the output from the ultrasonic "radar" which represents the distance to an object from a camera is compared with the signal representative of the distance to an object as a function of, for instance, the angle of rotation of the focusing ring. When the two output signals are coincident with each other, the rotation of the focusing ring is locked or arrested in a manner substantially similar to that described above.

In summary, the present invention provides a camera such as a single-lens reflex camera with a wide variety of interchangeable lenses each having a focusing ring. The camera is incorporated with a focus detection system which is very simple in construction and a locking or arresting device. The focusing ring is manually rotated so as to sharply focus an object and when the focus detection system detects that the object is sharply focused, it delivers the output signal to the locking or arresting device which in turn locks or arrests the rotation of the focusing ring by pressing the locking or arresting pin against the focusing ring. When the focusing ring is locked or arrested in this manner, one can fully sense that the object is sharply focused. The locking or arresting device can be incorporated in the camera without any modification of the complex mechanism for advancing or retracting the photographic lens group. When the object moves, the locking or arresting device can immediately release the focusing ring so that one can manually rotate the focusing ring again so as to focus the object moved to a new position.

What is claimed is:

1. A camera upon which is mounted a selected one of various types of interchangeable lenses each having a manually rotatable focusing ring with an inner annular surface, for focusing a subject, said camera comprising:
    focus detection means for generating a control signal when, in the course of manual rotation of said focusing ring, a subject in the line of said lens is sharply focused;
    a focusing ring locking member mounted adjacent said annular surface for selective engagement therewith; and
    actuating means responsive to said control signal for moving said locking member into engagement with said annular surface to resist further manual rotation of said focusing ring.

2. A camera as set forth in claim 5, wherein said focus detection means comprises
    a sensor which is disposed at a point or plane at or on which the image of said subject is focused through said interchangeable lens, and
    a focus detection circuit responsive to the output signal from said sensor for generating an output signal when the image of an object is sharply focused.

3. A camera as set forth in claim 5 or claim 2 wherein said actuating means comprises
    an electromagnet adapted to be energized in response to said control signal from said focus detection means or said focus detection circuit, and
    an armature adapted to be attracted by said electromagnet when the latter is energized, and said locking member comprises a locking or arresting pin which is movable in parallel with the optical axis of said interchangeable lens and which is operatively coupled to said armature in such a way that when said electromagnet is energized so that said armature is attracted thereby, said locking or arresting pin is forced toward and pressed against said annular surface of said focusing ring of said interchangeable lens, thereby locking or arresting the further manual rotation of said focusing ring.

4. A camera as set forth in one of claims 1, 2 and 3 further comprising a switch for selectively permitting or interrupting the transmission of said control signal from said focus detection means or said focus detection circuit to said actuating means.

* * * * *